(12) United States Patent
Kato et al.

(10) Patent No.: US 8,163,218 B2
(45) Date of Patent: Apr. 24, 2012

(54) INJECTION MOLDING MACHINE FOR TWO-MATERIAL MOLDING AND METHOD OF CONTROLLING THE SAME

(75) Inventors: Naoki Kato, Aichi (JP); Hiroto Matsushita, Aichi (JP); Yasuo Okochi, Aichi (JP); Yasuaki Ozeki, Aichi (JP); Masamitsu Saji, Aichi (JP); Toshihiko Kariya, Aichi (JP)

(73) Assignee: Mitsubishi Heavy Industries Plastic Technology Co., Ltd., Aichi (JP)

( * ) Notice: Subject to any disclaimer, the term of this patent is extended or adjusted under 35 U.S.C. 154(b) by 130 days.

(21) Appl. No.: 12/746,331

(22) PCT Filed: Mar. 25, 2008

(86) PCT No.: PCT/JP2008/055596
§ 371 (c)(1),
(2), (4) Date: Jun. 4, 2010

(87) PCT Pub. No.: WO2009/118833
PCT Pub. Date: Oct. 1, 2009

(65) Prior Publication Data
US 2010/0244314 A1    Sep. 30, 2010

(51) Int. Cl.
*B29C 45/10*    (2006.01)
*B29C 45/32*    (2006.01)
*B29C 45/64*    (2006.01)

(52) U.S. Cl. .............. 264/255; 264/297.8; 264/328.8; 425/130; 425/534; 425/588

(58) Field of Classification Search .......... 425/130, 425/534, 588, 589; 264/255, 297.2, 297.8, 264/328.8, 328.11, 538
See application file for complete search history.

(56) References Cited

U.S. PATENT DOCUMENTS

| 2,447,101 | A | * | 8/1948 | Stock | 425/183 |
| 4,307,057 | A | * | 12/1981 | Hettinga | 264/328.8 |
| 4,427,359 | A | * | 1/1984 | Fukuoka et al. | 425/525 |
| 4,439,133 | A | * | 3/1984 | Rees et al. | 425/556 |

(Continued)

FOREIGN PATENT DOCUMENTS

JP    03-051207 B2    8/1991
(Continued)

OTHER PUBLICATIONS

International Search Report of PCT/JP2008/055596, Mailing Date of Jul. 1, 2008.

*Primary Examiner* — Jill Heitbrink
(74) *Attorney, Agent, or Firm* — Westerman, Hattori, Daniels & Adrian, LLP

(57) ABSTRACT

In an injection molding machine for two-material molding including two sets of injection units 11, 12 that plasticize different resin materials and injection-fill the materials, a mold clamping unit is a hydraulic mold clamping unit that mold-clamps three sets of die plates 2, 3, 9 simultaneously, a movable die plate opening and closing unit 14 is a movable die plate opening and closing unit driven by an electric motor, a rotational die plate opening and closing unit 15 is a rotational die plate opening and closing unit 14 driven by an electric motor, and a rotating unit for the rotational die plate 9 is a rotation driving unit driven by an electric motor attached to a reversal pedestal 7.

20 Claims, 9 Drawing Sheets

U.S. PATENT DOCUMENTS

| | | |
|---|---|---|
| 5,728,409 A | 3/1998 | Schad et al. |
| 2006/0177540 A1 | 8/2006 | Lichtinger |

FOREIGN PATENT DOCUMENTS

| | | |
|---|---|---|
| JP | 04-371360 A | 12/1992 |
| JP | 06-254906 A | 9/1994 |
| JP | 10-000645 A | 1/1998 |
| JP | 10-000647 A | 1/1998 |
| JP | 2003-062853 A | 3/2003 |
| JP | 2003-205538 A | 7/2003 |
| JP | 2006-168223 A | 6/2006 |
| JP | 2007-152820 A | 6/2007 |

* cited by examiner

A-A

INJECTION MOLDING MACHINE FOR TWO-MATERIAL MOLDING AND METHOD OF CONTROLLING THE SAME

TECHNICAL FIELD

The present invention relates to an injection molding machine for two-material molding that injects different types of resin from two sets of injection units into two respective cavities defined by a mold of a movable die plate, a mold of a fixed die plate, and molds on both sides of a rotational die plate provided between the two die plates, and rotates the rotational die plate 180 degrees to perform two-layer injection, whereby the two materials are integrally molded. In particular, the present invention relates to an injection molding machine for two-material molding that includes a moving unit that facilitates control of the movement speeds of the movable die plate and the rotational die plate and a rotating unit that facilitates control of the rotational speed of the rotational die plate, and to a method of controlling the movement speeds and the rotational speed.

BACKGROUND ART

An example of a molding method for producing a molding of different materials and different colors with an injection molding machine is to injection-mold one resin material into a primary side mold, feed the resultant primary molding to a secondary side mold, and injection-mold the other resin material into a gap between the cavity of the secondary side mold and the primary molding. Various types of injection molding apparatuses for two-material molding have been proposed (see Patent Documents 1 and 2).

Among such molding apparatuses, a conventional example disclosed in Patent Document 1 will be explained. An injection molding machine for two-material molding injection-molds one resin material from two sets of injection units into a primary side of two cavities defined by a mold of a movable platen, a mold of a fixed platen, and molds on both sides of a rotational platen provided between the two platens, rotates the rotational platen 180 degrees, and injects the other resin material into a secondary side cavity, whereby the two materials are integrally molded. The rotational platen is moved by a specific hydraulic cylinder. The movable platen is opened and closed by a hydraulic cylinder composed of a ram on an end of a tie bar provided to penetrate the movable platen, the rotational platen, and the fixed platen and a cylinder fixedly provided to the fixed platen. The rotational platen is rotated by rotation driving means that is not specified. The movable platen, the rotational platen, and the fixed platen after mold closing are mold-clamped by a mold clamping cylinder composed of a large-diameter hydraulic cylinder incorporated in the fixed platen and a ram that is slidable in the cylinder. The ram having a large diameter has a function detachable from the tie bar.

The molding effects achieved by this injection molding machine are: drawing the rotational platen by the specific hydraulic cylinder toward the fixed platen side, moving the movable platen for mold closing toward the fixed platen side by the hydraulic cylinder provided between an end of the tie bar and the fixed platen, clamping both the movable platen and the rotational platen by the mold clamping cylinder to boost the pressure of hydraulic oil, injection-molding one resin material from one injection unit into the primary side cavity, rotating the rotational platen 180 degrees to clamp both the movable platen and the rotational platen again, and injecting the other resin material from the other injection unit into the secondary side cavity, whereby the two materials are integrally molded.

A conventional multi-material injection molding machine described in Patent Document 2 is a molding machine that produces a multi-material molding by using molds composed of a fixed mold, a movable mold, and a rotational mold rotating between the fixed mold and the movable mold. The machine includes a first injection machine that injects a molten material into the fixed mold, a second injection machine that injects a molten material into the movable mold, a rotational mold supporting device that supports the rotational mold rotatably and movably toward the movable mold side with a fixed platen, and pressure-clamping means for pressure-clamping the fixed mold and the movable mold through the rotational mold.

The molding effects achieved by this injection molding machine are almost the same as those achieved by the injection molding machine in Patent Document 1.

[Patent Document 1] Japanese Patent Examined Publication No. H3-51207 (FIG. 1)

[Patent Document 2] Japanese Patent Application Laid-open No. 2006-168223 (FIG. 1)

DISCLOSURE OF INVENTION

Problem to be Solved by the Invention

The conventional example of Patent Document 1 employs the hydraulic cylinders for mold opening and closing of the movable platen and the rotational platen. However, because the mold platens have large weights, it is difficult to perform highly accurate control of their speeds and positions depending on changes in the temperature of hydraulic oil during their operations. Therefore, high-speed mold opening and closing may damage the molds. In addition, if hydraulic systems with a common hydraulic pump are employed for operating the mold opening and closing of the movable platen and the mold opening and closing of the rotational platen in parallel, the flow of hydraulic oil supplied to each mold opening and closing hydraulic cylinder is unstable, which may result in fluctuations in their operations. It is thus not easy to achieve high-speed mold opening and closing operation by hydraulic cylinders. While no description is made about the rotation driving means of the rotational platen, the rotational platen also has a large weight and a large rotational moment; therefore, it will arise the same problem as mentioned above if a hydraulic cylinder or a hydraulic motor is employed therefor.

In the conventional example of Patent Document 2, like in the conventional example of Patent Document 1, driving means for moving the molds is driving means that uses hydraulic cylinders. While linear moving means and rotating means by servomotors and ball screws are cited to replace hydraulic driving, hydraulic driving is employed in the description of embodiments. Moreover, the rotational mold is supported rotatably and movably toward the movable mold side by a member extended from the fixed platen; however, because it is a cantilever member and cannot ensure sufficient stiffness structurally, it is difficult to support the rotational mold having a large weight with no flexure and with high accuracy. Because the rotational platen is added in the strokes of the fixed platen and the movable platen of the existing molding machine, it is difficult to ensure sufficient movement strokes of the movable platen and the rotational platen with respect to the rotational operation of the rotational mold having a large width. Furthermore, the member extended from the fixed platen to support the rotational mold has upper and lower individual sections that need to be incorporated in the fixed platen individually; therefore, it is difficult to make the rotational central axes of the upper and the lower sections concentric, and thus galling, abrasion, or other problems may occur in a bearing during rotation of the rotational mold. In addition, because molds on both sides and a mold rotational shaft are integrally structured to reduce the weight of the rotational mold, the replacement of the molds is not easy.

In view of the problems described above, the present invention has an object to provide a rotational mold platen that is replaceable with standard molds and a mold platen driving unit that enables highly accurate and stable operation even when mold opening and closing of a movable platen and the rotational platen are performed even at high speed.

Means for Solving Problem

According to an aspect of the present invention, an injection molding machine for two-material molding includes: a reversal pedestal that is provided between a movable die plate to which a movable side mold is attached and a fixed die plate to which a fixed side mold is attached and movably in a same direction as the movable die plate; a rotational die plate that is 180 degrees rotatable on the reversal pedestal and to which molds are attached on both sides thereof to fit with the movable side mold and the fixed side mold and define respective cavities; a movable die plate mold opening and closing unit that opens and closes the mold of the movable die plate; a rotational die plate mold opening and closing unit that opens and closes the molds of the rotational die plate; a mold clamping unit that mold-clamps the three sets of die plates simultaneously after mold closing; and two sets of injection units that plasticize different resin materials and injection-fill the materials. The mold clamping unit is a hydraulic mold clamping unit that mold-clamps the three sets of die plates simultaneously, the movable die plate opening and closing unit is a movable die plate opening and closing unit driven by an electric motor, the rotational die plate opening and closing unit is a rotational die plate opening and closing unit driven by an electric motor, and a rotating unit for the rotational die plate is a rotation driving unit driven by an electric motor attached to the reversal pedestal.

Advantageously, in the injection molding machine for two-material molding, the hydraulic mold clamping unit includes a plurality of hydraulic cylinder apparatuses incorporated in the fixed die plate, a plurality of tie bars having grooves on leading ends thereof, the tie bars being connected to rams of the respective cylinder apparatuses and provided to penetrate the rotational die plate and the movable die plate, and split nuts provided outside of the movable die plate and engageable with the grooves of the tie bars; and is a hydraulic mold clamping unit that mold-clamps the three sets of die plates simultaneously, the movable die plate opening and closing unit is a movable die plate opening and closing unit including a ball screw shaft driven by an electric motor, and a ball screw nut attached to the rotational die plate and threaded onto the ball screw shaft, the rotational die plate opening and closing unit is a rotational die plate opening and closing unit including a ball screw shaft driven by an electric motor, and a ball screw nut attached to the reversal pedestal and threaded onto the ball screw shaft, the rotating unit for the rotational die plate is a rotation driving unit that drives a horizontal large gear provided 180-degree forwardly and backwardly rotatably with respect to a vertical central axis of the reversal pedestal and provided to the rotational die plate with a pinion provided to an output shaft of an electric motor provided to the reversal pedestal.

Advantageously, in the injection molding machine for two-material molding, the movable die plate opening and closing unit includes a ball screw shaft driven by an electric motor fixed to the fixed die plate or a base, and a ball screw nut attached to the movable die plate and threaded onto the ball screw shaft.

Advantageously, in the injection molding machine for two-material molding, the movable die plate opening and closing unit includes a ball screw shaft driven by an electric motor fixed to the reversal pedestal and rotatably supported through a ball bearing by a support base fixedly provided to the reversal pedestal with an axial direction of the ball screw shaft restrained, and a ball screw nut fixedly provided to the movable die plate and threaded onto the ball screw shaft.

Advantageously, in the injection molding machine for two-material molding, the rotating unit for the rotational die plate drives a horizontal large gear provided 180-degree rotatably with respect to a vertical central axis of the reversal pedestal and attached to the rotational die plate through a toothed belt or a chain and a pinion with an electric motor provided to the reversal pedestal.

Advantageously, in the injection molding machine for two-material molding, the rotating unit for the rotational die plate is directly driven by an electric motor attached to the reversal pedestal and rotating the rotational die plate 180 degrees.

Advantageously, in the injection molding machine for two-material molding, one set out of the two sets of injection units is provided on the fixed die plate side and is used for resin injection to the fixed mold, and another set is provided on the movable die plate side and is used for resin injection to the movable mold and moves during operation along with movement of the movable die plate.

Advantageously, the injection molding machine for two-material molding further includes a positioning pin provided to the reversal pedestal and on which the rotational die plate rotating on the reversal pedestal abuts at rotational limits thereof, the positioning pin being made to protrude so that the rotational die plate is placed face to face with an opposite die plate at a position where the rotational die plate reaches one rotational limit and at a position of another rotational limit in a returning direction thereof.

Advantageously, in the injection molding machine for two-material molding further includes: a mold clamping apparatus that is hydraulically driven and mold-clamps the three sets of die plates simultaneously; a movable die plate opening and closing apparatus that is driven by an electric motor and moves the movable die plate forwardly and backwardly with respect to the fixed die plate; a rotational die plate opening and closing apparatus that is driven by an electric motor and operates the rotational die plate and the reversal pedestal in a direction same as the movable die plate; a reversal pedestal rotating apparatus that is driven by an electric motor and rotates the reversal pedestal in a horizontal direction; and a control apparatus that is capable of feedback control of operation of each of the electric motors.

Advantageously, the injection molding machine for two-material molding further includes: a mold clamping apparatus that is hydraulically driven and mold-clamps the three sets of die plates simultaneously; a movable die plate opening and closing apparatus that is driven by an electric motor and moves the movable die plate forwardly and backwardly with respect to the fixed die plate; a rotational die plate opening and closing apparatus that is driven by an electric motor and operates the rotational die plate and the reversal pedestal in a direction same as the movable die plate; a reversal pedestal rotating apparatus that is driven by an electric motor and rotates the reversal pedestal in a horizontal direction; and a control apparatus that is capable of feedback control of operation of each of the electric motors. At least one of the electric motors is a servomotor.

Advantageously, the injection molding machine for two-material molding further includes: a mold clamping apparatus that is hydraulically driven and mold-clamps the three sets of die plates simultaneously; a movable die plate opening and closing apparatus that is driven by an electric motor and moves the movable die plate forwardly and backwardly with respect to the fixed die plate; a rotational die plate opening and closing apparatus that is driven by an electric motor and operates the rotational die plate and the reversal pedestal in a direction same as the movable die plate; a reversal pedestal rotating apparatus that is driven by an electric motor and rotates the reversal pedestal in a horizontal direction; and a control apparatus that is capable of feedback control of operation of each of the electric motors. In speed control by the feedback control, speed control for acceleration or deceleration causes acceleration or deceleration to follow a primary linear line with a constant gradient, and speed control for acceleration or deceleration from a constant speed causes speed control to follow a quadric curve that is tangent to each primary linear speed of the constant speed and acceleration or the constant speed and deceleration.

Advantageously, the injection molding machine for two-material molding further includes: a mold clamping apparatus that is hydraulically driven and mold-clamps the three sets of die plates simultaneously; a movable die plate opening and closing apparatus that is driven by an electric motor and moves the movable die plate forwardly and backwardly with respect to the fixed die plate; a rotational die plate opening and closing apparatus that is driven by an electric motor and operates the rotational die plate and the reversal pedestal 7 in a direction same as the movable die plate; a reversal pedestal rotating apparatus that is driven by an electric motor and rotates the reversal pedestal in a horizontal direction; and a control apparatus that is capable of feedback control of operation of each of the electric motors. In positioning to the reversal pedestal with the pin, the positioning pin is insertable into a positioning pin insertion hole at a position where the rotational die plate rotating on the reversal pedestal is placed face to face with an opposite die plate.

Advantageously, the injection molding machine for two-material molding further includes: a mold clamping apparatus that is hydraulically driven and mold-clamps the three sets of die plates simultaneously; a movable die plate opening and closing apparatus that is driven by an electric motor and moves the movable die plate forwardly and backwardly with respect to the fixed die plate; a rotational die plate opening and closing apparatus that is driven by an electric motor and operates the rotational die plate and the reversal pedestal in a direction same as the movable die plate; a reversal pedestal rotating apparatus that is driven by an electric motor and rotates the reversal pedestal in a horizontal direction; and a control apparatus that is capable of feedback control of operation of each of the electric motors. In positioning to the reversal pedestal with the pin, the positioning pin is insertable into a positioning pin insertion hole at a position where the rotational die plate rotating on the reversal pedestal is placed face to face with an opposite die plate, and the injection molding machine for two-material molding further includes: a control apparatus that enables control to start insertion operation of the positioning pin at a predetermined position in a rotational direction of the reversal pedestal that is reversely rotating where center of the positioning pin insertion hole is just ahead of coinciding with center of the positioning pin of a positioning pin insertion apparatus.

Advantageously, in the injection molding machine for two-material molding, a reinforcement rib of the rotational die plate has a thickness that reduces outwardly from center of the rotational die plate gradually.

Advantageously, in the injection molding machine for two-material molding further includes a driving apparatus provided in the rotational die plate and performing operations of movable members in the molds, such as molding ejection operation, movable nesting operation, and gate valve operation in the molds.

Advantageously, in the injection molding machine for two-material molding further includes: a driving apparatus provided in the rotational die plate and performing operations of movable members in the molds, such as molding ejection operation, movable nesting operation, and gate valve operation in the molds; and a communication apparatus capable of sending and receiving control signals wirelessly for operational control of a molding ejection apparatus.

Advantageously, in the injection molding machine for two-material molding, one set out of the two sets of injection units is provided on the fixed die plate side and forwardly and backwardly movably with respect to the fixed die plate, another set is provided on a slidable based fixed on the movable die plate side and forwardly and backwardly movably with respect to the movable die plate, in mold opening and closing of the movable die plate, the other set of injection units is movable while abutting to the mold attached to the movable die plate.

According to another aspect of the present invention, a method of controlling an injection molding machine for two-material molding that uses the injection molding machine for two-material molding described above includes: in a molding process of: mold closing of the movable die plate and the reversal pedestal on which the rotational die plate is mounted, mold clamping thereof, injection filling of molten resin, cooling thereof, mold opening movement of the movable die plate and the reversal pedestal on which the rotational die plate is mounted, 180-degree rotation of the rotational die plate, mold re-closing of the movable die plate and the reversal pedestal on which the rotational die plate is mounted, and mold clamping thereof, performing control for acceleration, speed maintenance, and deceleration with an electric motor to make mold opening and closing movement time of the movable die plate and the reversal pedestal on which the rotational die plate is mounted shortest.

According to another aspect of the present invention, a method of controlling an injection molding machine for two-material molding that uses the injection molding machine for two-material molding described above includes: performing control for rotational acceleration, rotational speed maintenance, and rotational deceleration with an electric motor to make rotational time of rotating the rotational die plate on the reversal pedestal 180 degrees shortest.

Advantageously, in the method of controlling an injection molding machine for two-material molding, a distance required for stopping the movable die plate or the rotational die plate that is moving is set as a collision avoidance distance, and each movement leading end position of the movable die plate and the mold thereof and the rotational die plate and the mold thereof is monitored, and when a relative position of the movement leading ends of both die plates or the molds thereof falls within the collision avoidance distance, an approaching one of the die plates that is moving is automatically decelerated or stopped to avoid collision during opening and closing movement of the movable die plate and the rotational die plate.

Advantageously, in the method of controlling an injection molding machine for two-material molding, a distance required for stopping the movable die plate or the rotational die plate that is moving is set as a collision avoidance distance, and each movement leading end position of the movable die plate and the mold thereof and the rotational die plate and the mold thereof is monitored, and when a relative position of the movement leading ends of both die plates or the molds thereof falls within the collision avoidance distance, an approaching one of the die plates that is moving is automatically decelerated or stopped to avoid collision during opening and closing movement of the movable die plate and the rotational die plate, and when the opening and closing movement of the movable die plate and the rotational die plate and rotation of the rotational die plate are performed in an overlapping manner, a relative distance between the rotational die plate or the mold thereof and the fixed die plate or the mold thereof and a relative distance between the rotational die plate or the mold thereof and the movable die plate or the mold thereof during the rotation of the rotational die plate are calculated based on a position of the movable die plate, a position and a rotational angle of the rotational die plate, and shape sizes of the molds thereof, and when any of the relative positions falls within the collision avoidance distance, movement of the die plate or rotation of the rotational die plate that is approaching is automatically decelerated or stopped.

Effect of the Invention

According to the present invention, by making mold opening and closing electrically driven, the speed accuracy and the positional accuracy of the movable die plate and the rotational die plate are enhanced, whereby collision can be avoided even in high-speed operation, and damage to the molds caused by impact can be prevented.

Because dedicated moving units (e.g., the ball screw shaft, the ball screw nut, servomotors) are provided for opening and closing of each of the movable die plate and the rotational die plate, simultaneous movement of the movable die plate and the rotational die plate is possible. Accordingly, by taking the relative position of the movable die plate and the rotational die plate into consideration, their mold opening and closing can be controlled with high accuracy while being linked with a molding ejection apparatus. This is effective for shortening the molding cycle and provides high reproducibility of the positions of the molds, and thus can avoid chuck failure when a molding is ejected.

By making reversion of the rotational die plate electrically driven, rotation can be smoothly accelerated and decelerated. This facilitates control to suppress vibrations at the start of rotation by reversion driving and at the stop of rotation and control of high-speed rotation. Therefore, even if the opening and closing operation of the movable die plate and the rotational die plate and the rotational operation of the rotational die plate are performed in parallel, by positional control for avoiding contact or collision therebetween, the molding process cycle can be made shorter.

By providing the rotation driving unit directly driven by a servomotor and thus involving no gear or belt, no backlash occurs in the operation of the rotational die plate. Therefore, positional control is made more preferable.

Higher speed reversion and shorter time for the mold opening and closing for reversion can shorten the time for which a molding is exposed to the atmosphere, and thereby suppressing problems accompanying a drop in the temperature of the molding. If a molding is exposed to the atmosphere, the surface temperature of the molding drops, and adhesion of two materials for integral molding of the two materials is impaired. Therefore, the time for which a molding is exposed to the atmosphere should be about 40 seconds to 50 seconds practically, equal to or less than 30 seconds preferably, and equal to or less than 20 seconds more preferably. Highly accurate control of the position where rotation stops has an advantageous effect of facilitating and ensuring fit with the positioning pin. By making most part of the operations of the die plates electrically driven, a molding apparatus that is kept cleaner can be provided.

Figure 1:
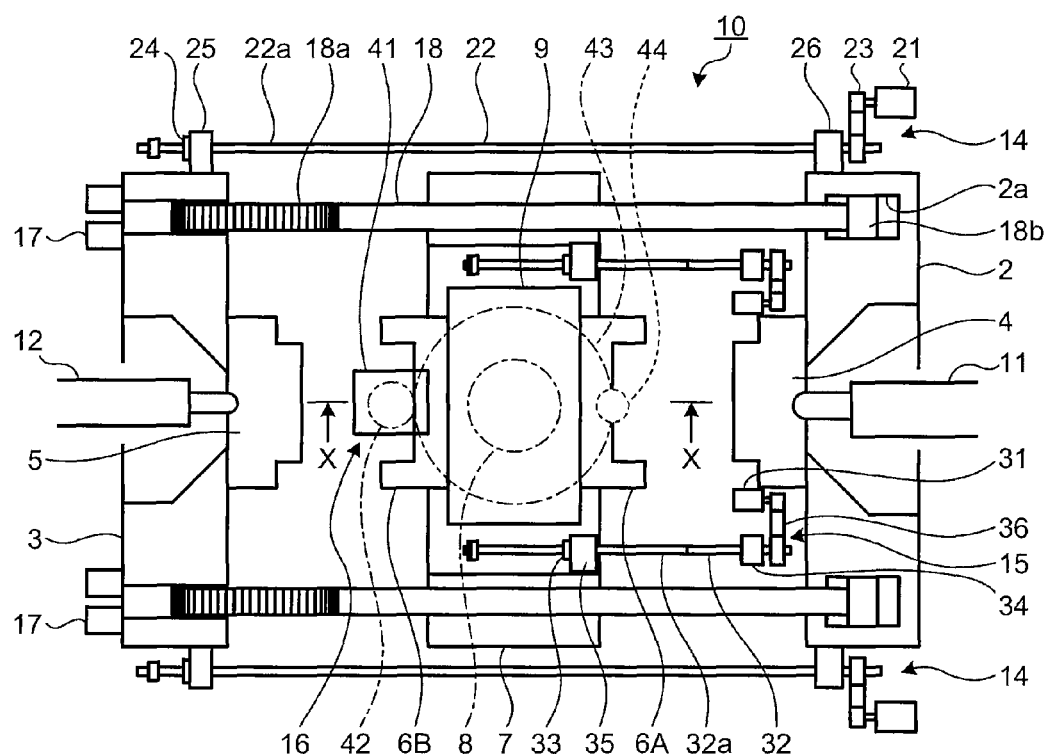
FIG. 1 is a schematic plan view of an injection molding machine for two-material molding according to a first embodiment of the present invention.

EXPLANATIONS OF LETTERS OR NUMERALS 2 fixed die plate
3 movable die plate
4 fixed side mold
5 movable side mold
6A rotational mold A
6B rotational mold B
7 reversal pedestal
8 rotational die plate
10, 30 injection molding machine for two-material molding
11 injection unit A
12 injection unit B
14, 46 movable die plate opening and closing unit
15 rotational die plate opening and closing unit
16, 50, 60 rotational die plate rotating unit
17 split nut
18 tie bar
21 servomotor A
22a, 32a, 47a ball screw
24, 33 ball screw nut 31 servomotor B
41 servomotor C
56 servomotor D

BEST MODE(S) FOR CARRYING OUT THE INVENTION

The present invention will now be explained in detail with reference to the accompanying drawings. These embodiments are not intended to limit the present invention. Constituent elements described in the embodiments below include elements readily thought of by those skilled in the art and substantially equivalent elements.
(First Embodiment)

This embodiment provides an injection molding machine for two-material molding that injects different types of resin into two respective cavities defined by a mold of a movable die plate, a mold of a fixed die plate, and molds on both sides of a rotational die plate provided between the two die plates, and rotates the rotational die plate 180 degrees to perform double injection, whereby the two materials are integrally molded. The injection molding machine for two-material molding includes electric driving units that facilitate control to move the movable die plate and the rotational die plate and to drive rotation of the rotational die plate.

The first embodiment will now be described with reference to some drawings.

Figure 2:
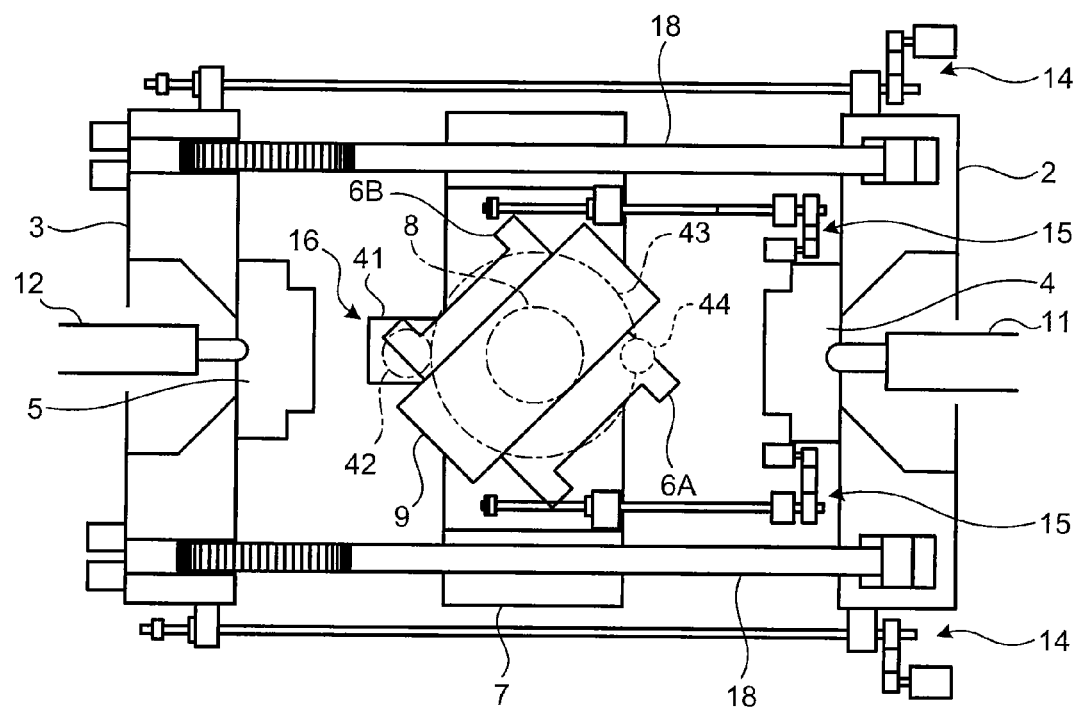
FIG. 2 is a diagram for illustrating rotational operation of a rotational die plate in the injection molding machine for two-material molding in FIG. 1.
Figure 3:
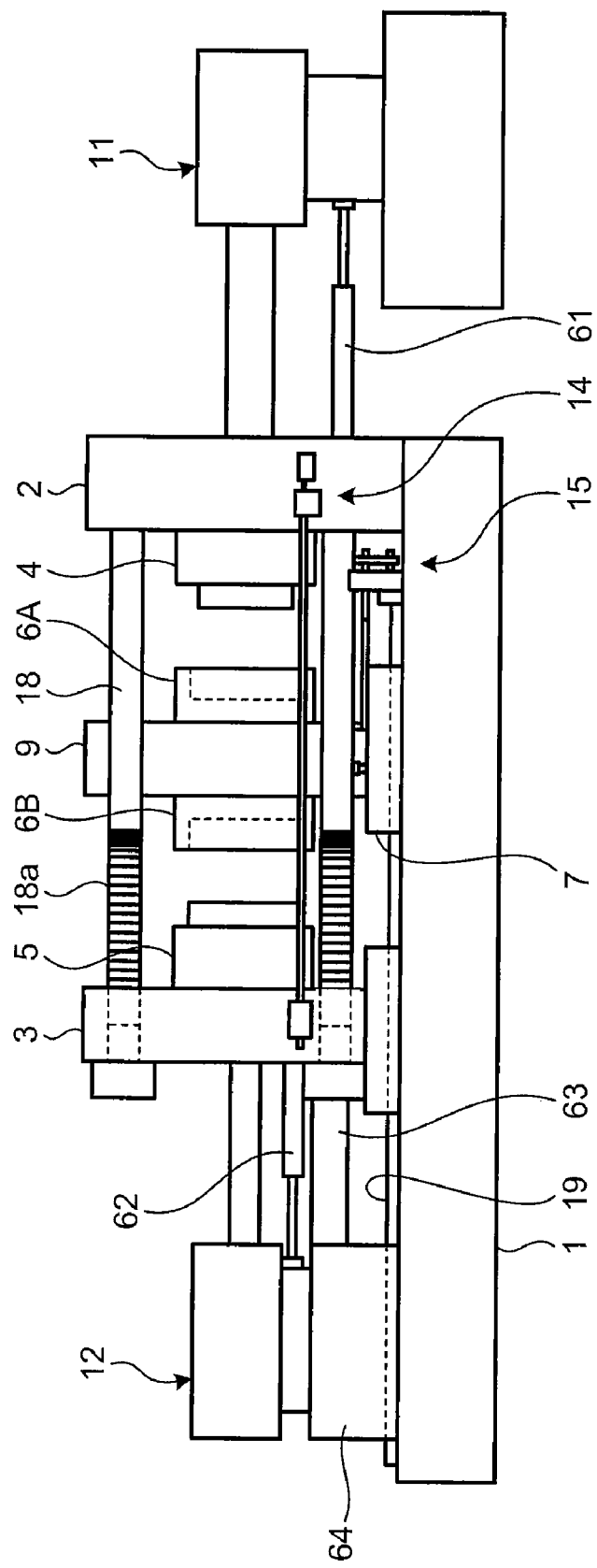
FIG. 3 is a side view of the injection molding machine for two-material molding in FIG. 1.
Figure 4:
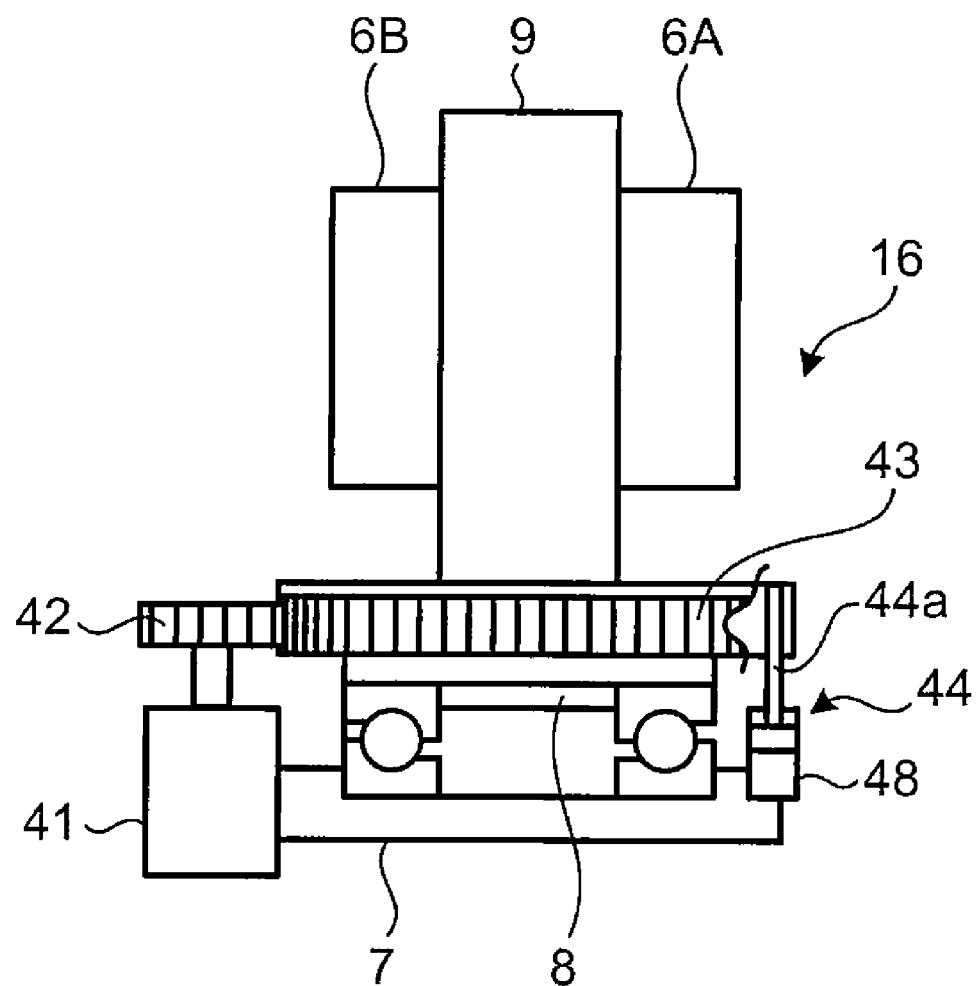
FIG. 4 is a side view taken through X-X, illustrating the schematic configuration of the rotational die plate in FIG. 1.
Figure 5:
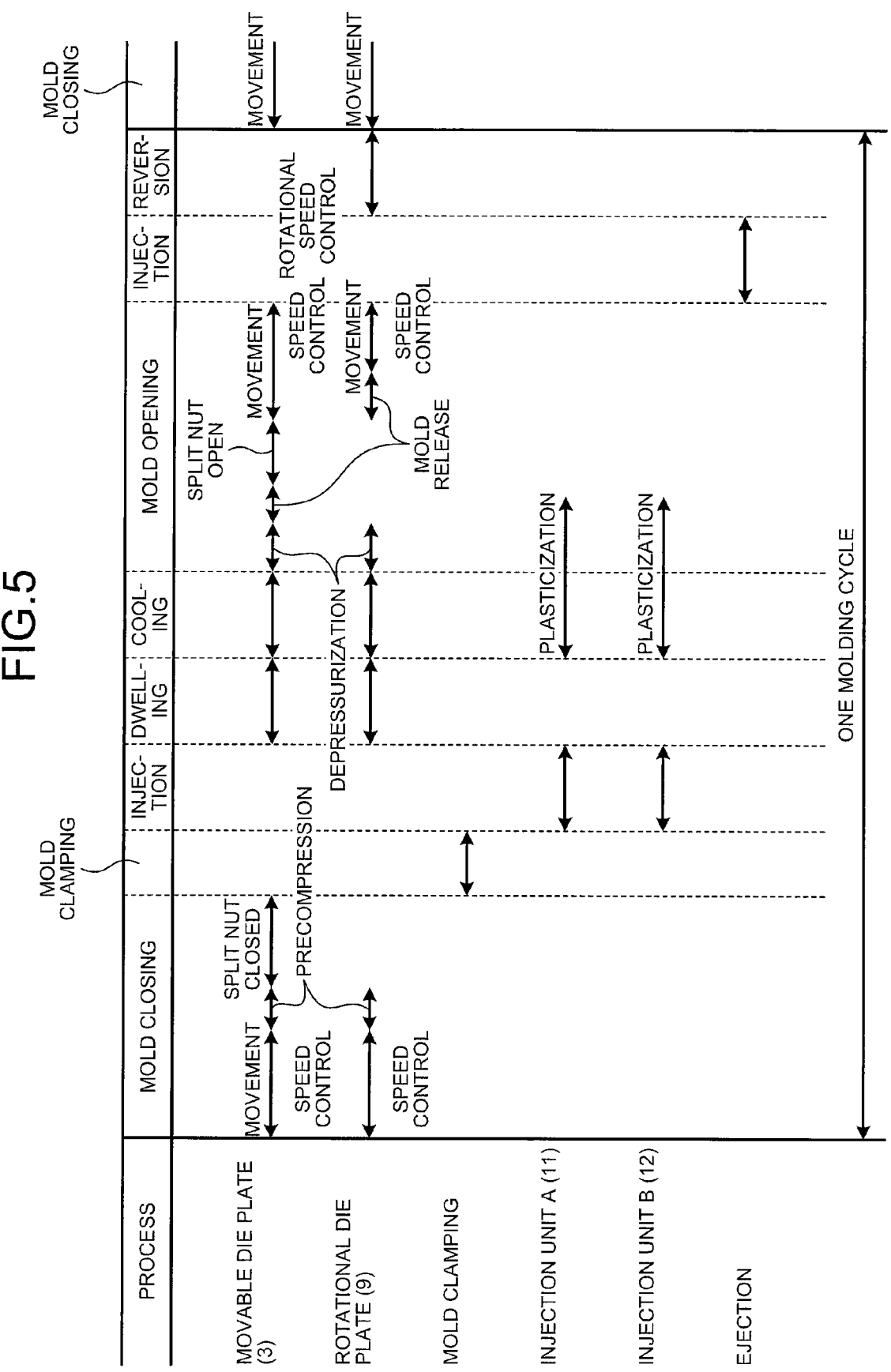
FIG. 5 is a process chart of two-material molding performed by the injection molding machine for two-material molding according to the present invention.
Figure 6:
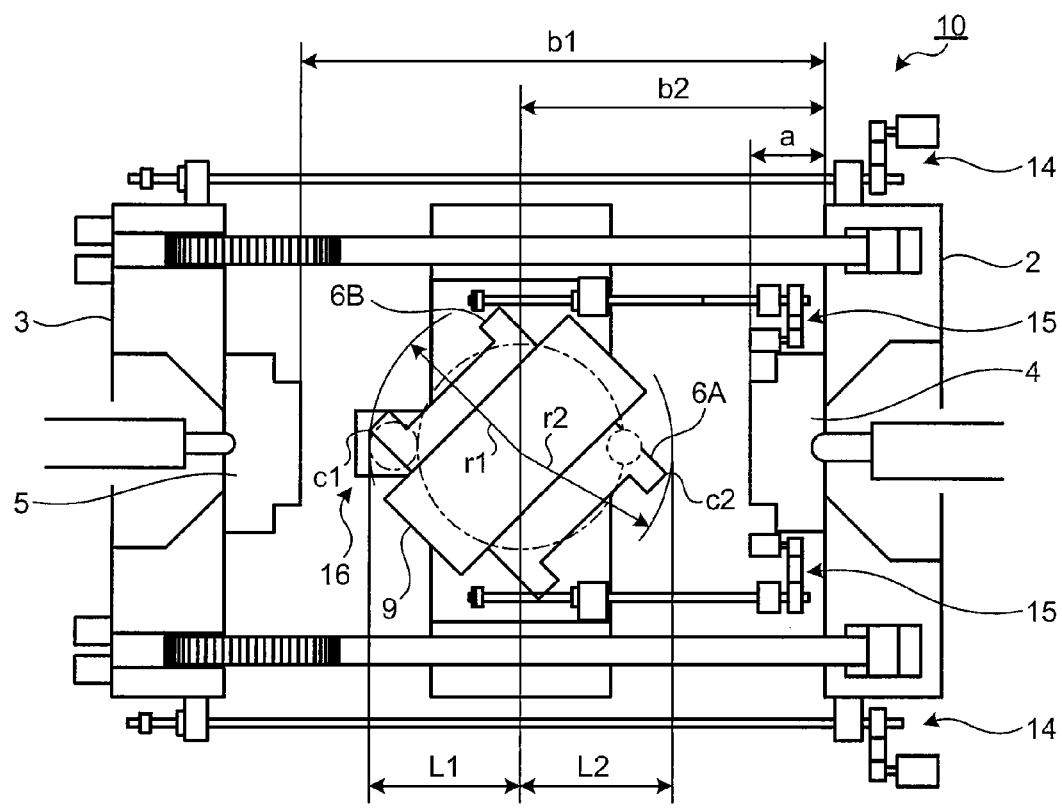
FIG. 6 is a diagram for illustrating a collision avoidance method during opening and closing of die plates in the injection molding machine for two-material molding according to the first embodiment of the present invention.

FIG. 1 is a schematic plan view of the injection molding machine for two-material molding according to the present invention. FIG. 2 is a diagram for illustrating the rotational operation of rotational die plate in the injection molding machine for two-material molding in FIG. 1. FIG. 3 is a side view of the injection molding machine for two-material molding in FIG. 1. FIG. 4 is a side view taken through X-X, illustrating the schematic configuration of the rotational die plate in FIG. 1. FIG. 5 is a process chart of two-material molding performed by the injection molding machine for two-material molding according to the present invention. FIG. 6 is a diagram for illustrating a collision avoidance method during opening and closing of die plates in the injection molding machine for two-material molding in FIG. 1.

The configuration of this injection molding machine 10 for two-material molding will now be described. In these diagrams, reference numeral 1 denotes a base. To one end of the base 1, a fixed die plate 2 to which a fixed side mold 4 is attached is fixedly provided. On the base 1, a rotational die plate 9 to which a rotational mold A (6A) and a rotational mold B (6B) are attached to face the fixed die plate 2 and a movable die plate 3 to which a movable side mold 5 is attached are movably mounted.

As illustrated in FIG. 4, the rotational die plate 9 is mounted on a reversal pedestal 7, rotated 180 degrees forwardly and reversely from a predetermined angular position, and positioned at another angular position that is placed face to face with the fixed die plate 2 and the movable die plate 3 by a positioning pin 44a of a positioning apparatus 44 and a hydraulic cylinder 48.

The movable die plate 3 and the reversal pedestal 7 on which the rotational die plate 9 is mounted are guided to move on the base 1 by a guide rail 19 fixedly provided to the base 1 through a linear bearing (not illustrated).

While the movable die plate 3 and the reversal pedestal 7 are guided to move preferably by the guide rail 19, an alternative use of a slidable plate or the like causes no practical problem in the present invention.

To both sides of the rotational die plate 9, the rotational mold A (6A) and the rotational mold B (6B) are attached that have the same shape to fit with the movable side mold 5 and the fixed side mold 4 and form cavities. Two sets of an injection unit A (11) and an injection unit B (12) plasticize different resin materials and inject the materials to fill two respective cavities formed by simultaneous mold clamping of the fixed die plate 2, the rotational die plate 9, and the movable die plate 3 by a mold clamping unit.

The injection unit A (11) is provided on the fixed die plate 2 side and is used for resin injection into the cavity defined by the fixed side mold 4 and the rotational mold A (6A) (or the rotational mold B (6B)), while the injection unit B (12) is provided on the movable die plate 3 side and is used for resin injection into the cavity defined by the movable side mold 5 and the rotational mold B (6B) (or the rotational mold A (6A)) and moves during its operation along with opening and closing movement of the movable die plate 3.

The injection unit B (12) moves by a large stroke together with the movable die plate 3. Because the injection unit B (12) is mounted on a slidable base 64 connected and fixed to the movable die plate 3 with a connecting and fixing member 63 interposed therebetween, with the movement of the slidable base 64 guided by the guide rail 19, the injection unit B (12) can move to follow the motion of the movable die plate 3 without delay.

In FIG. 3, reference numeral 62 denotes a nozzle touch cylinder for the injection unit B (12), and the nozzle touch cylinder enables the injection unit B (12) to slide on the slidable base 64. In FIG. 3, reference numeral 61 denotes a nozzle touch cylinder for the injection unit A (11).

Figure 10:
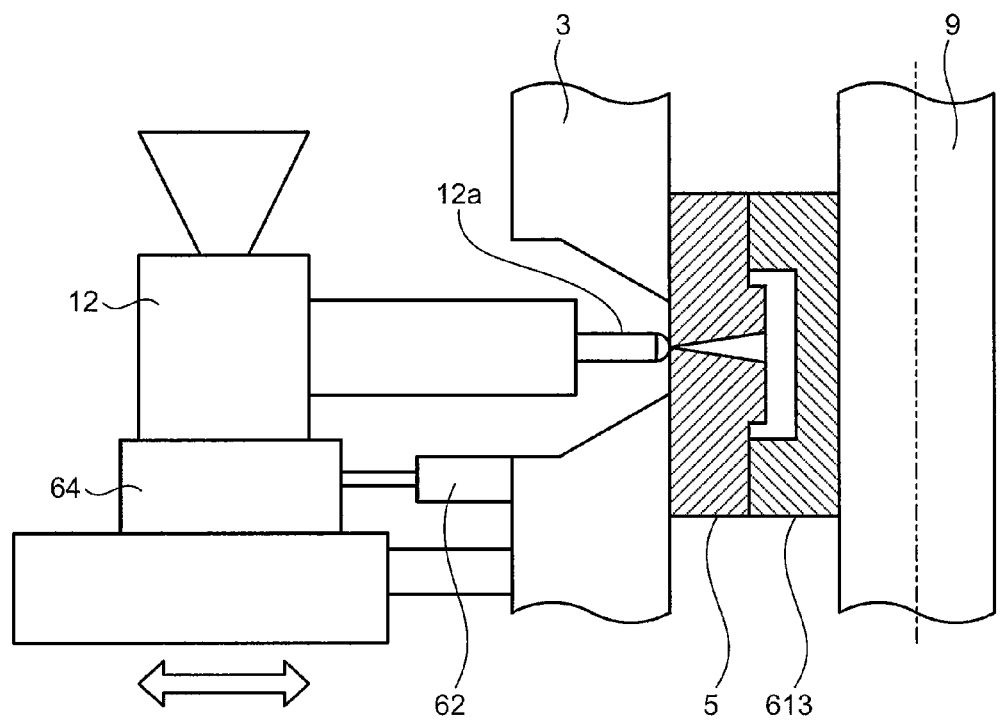
FIG. 10 is a diagram for illustrating an injection unit B.

FIG. 10 illustrates a nozzle touch state.

As illustrated in FIG. 10, a nozzle 12a for the injection unit B (12) is in contact with the movable side mold 5, and a nozzle touch state is achieved during mold opening and closing. Therefore, resin can be injected through the nozzle once mold closing and pressure boosting are completed, which makes the process cycle shorter.

When the mold is open, the nozzle 12a does not leave the movable side mold 5, whereby drooling of resin at the tip of the nozzle 12a can be prevented.

Furthermore, the injection unit B (12) can be operated integrally with the movable platen. Therefore, reduction in shock accompanying operational start or operational stop is achieved, and prevention of collision between the injection unit B (12) and the mold caused by such shock is also achieved.

Opening and closing units for the movable die plate 3 and the rotational die plate 9 and a rotating unit for the rotational die plate 9 will now be described.

Movable die plate opening and closing units 14 provided in a pair symmetrically on both sides of the injection molding machine 10 for two-material molding each include a servomotor A (21) fixedly provided to the base 1 or the fixed die plate 2, a ball screw shaft A (22), a support base 26 fixedly provided to the base 1 or the fixed die plate 2 and rotatably supporting the ball screw shaft A (22) while restraining the shaft A (22) in the axial direction, a ball screw nut A (24) threaded onto a ball screw 22a of the ball screw shaft A (22), a nut support base 25 to which the ball screw nut A (24) is attached and that is fixedly provided to the movable die plate 3, and a power transmission mechanism 23 (e.g., a gear pulley and a toothed belt, a geared speed reducer) transmitting the rotational force of the servomotor A (21) to the ball screw shaft A (22). Operations of a pair of such servomotors A (21) are in synchronization, whereby the movable die plate 3 can move for opening and closing in parallel with the fixed die plate 2.

Rotational die plate opening and closing units 15 provided in a pair symmetrically on both sides of the injection molding machine 10 for two-material molding each include a servomotor B (31) fixedly provided to the base 1 or the fixed die plate 2, a ball screw shaft B (32), a support base 34 fixedly provided to the base 1 or the fixed die plate 2 and rotatably supporting the ball screw shaft B (32) while restraining the shaft B (32) in the axial direction, a ball screw nut B (33) threaded onto a ball screw 32a of the ball screw shaft B (32), a nut support base 35 to which the ball screw nut B (33) is attached and that is fixedly provided to the reversal pedestal 7, and a power transmission mechanism 36 (e.g., a gear pulley and a toothed belt, a geared speed reducer) transmitting the rotational force of the servomotor B (31) to the ball screw shaft B (32). Operations of a pair of such servomotors (31) are in synchronization, whereby the reversal pedestal 7 can move for opening and closing in parallel with the fixed die plate 2.

A rotational die plate rotating unit 16 includes, as illustrated in FIG. 4, a servomotor C (41) attached to the reversal pedestal 7, a pinion 42 attached to the servomotor C (41), a large gear 43 meshing with the pinion 42 and integrally provided to the rotational die plate 9, and a positioning pin 44 for positioning at a position for the fixed die plate 2 (or the movable die plate 3) set by the rotational die plate 9 and at another position rotated 180 degrees from the first position, and is a rotation driving unit that makes the rotational die plate 9 one-half turn in a forward-and-backward direction. Reference numeral 8 denotes a lower shaft integral with the rotational die plate 9, and the shaft is rotatable with respect to the reversal pedestal 7 through a bearing.

Accordingly, highly accurate positioning can be achieved.

In this positioning, at the position where the rotational die plate 9 rotating on the reversal pedestal 7 is placed face to face with the opposite die plate, the hydraulic cylinder 48 may cause the positioning pin 44a to be insertable into a positioning pin insertion hole (not illustrated).

A control apparatus may be further provided that enables control to start insertion operation of the positioning pin 44a at a predetermined position in the rotational direction of the reversal pedestal that is reversely rotating where the center of the positioning pin insertion hole is just ahead of coinciding with the center of the positioning pin of a positioning pin insertion apparatus.

This makes the molding process cycle shorter.

As for the control of the servomotor C (41) that drives the rotational operation of the reversal pedestal 7, when the positioning pin 44a is being inserted, mechanical following by the positioning pin can replace positioning of the reversal pedestal 7 by a servo motor, with part of the control for positioning control by the servomotor C (41) stopped. In this manner, a rotational position nonsensitive region of the reversal pedestal 7 caused by a backlash between the pinion 42 and the large gear 43 can be ignored, whereby hunting during very-low-speed rotational control can be prevented. In this case, the insertion hole for the positioning pin 44a preferably has a shape somewhat tapered from the pin side.

A hydraulic mold clamping unit includes, as illustrated in FIG. 1, four hydraulic cylinders 2a incorporated in the fixed die plate 2, four tie bars 18 having ring grooves 18a on their leading ends, the tie bars 18 being connected to rams 18b of the respective cylinders 2a and provided to penetrate the movable die plate 3, and four sets of split nuts 17 provided outside of the movable die plate 3 and engageable with the ring grooves 18a of the tie bars 18; and is a hydraulic mold clamping unit that mold-clamps the three sets of die plates 2, 9, 3 simultaneously.

Referring next to FIG. 5, the process of two-material injection molding performed by the injection molding machine 10 for two-material molding will be described.

As illustrated in FIG. 5, after the first mold closing to mold-close the rotational die plate 9 and the movable die plate 3 with the fixed die plate 2, mold closing by the hydraulic cylinders 2a is performed, and molten resin A from the injection unit A (11) is injected to fill the cavity defined by the rotational mold A (6A) and the fixed side mold 4. After this state is kept for a certain period of time for which the resin A is to be solidified, the movable die plate 3 and the reversal pedestal 7 on which the rotational die plate 9 is mounted are moved for mold opening to keep a sufficient gap between each of the die plates 2, 9, 3. After the rotational die plate 9 is rotated 180 degrees, the movable die plate 3 and the rotational die plate 9 are mold re-closed.

In the molding process after this mold re-closing, after the mold clamping by the hydraulic cylinders 2a, molten resin A from the injection unit A (11) is injected to fill the cavity defined by the rotational mold B (6B) and the fixed side mold 4. At the same time, molten resin B from the injection unit B (12) is injected to fill the cavity defined by the molding attached to the rotational mold A (6A) and the movable side mold 5. Accordingly, a two-material molding in which the two materials overlap is formed. After this state is kept for a certain period of time for which both the resin A and the resin B are to be solidified, the movable die plate 3 and the reversal pedestal 7 on which the rotational die plate 9 is mounted are moved for mold opening to keep a sufficient gap between each of the die plates 2, 9, 3. After the two-material molding attached to the movable side mold 5 is removed outside the machine, the rotational die plate 9 is rotated 180 degrees.

The following processes for mold closing of the movable die plate 3 and the rotational die plate 9 with the fixed die plate 2 and for molding are performed by repeating the molding process after the mold re-closing.

Referring to FIG. 5, injection filling operations performed by the injection unit A (11) and the injection unit B (12) are performed simultaneously. When the mold 4 and the mold 5 are used for different molding processes, e.g., injection compression molding, foam molding, gas-assisted molding, and insert molding, injection filling operations performed by the injection unit A (11) and the injection unit B (12) may be performed sequentially.

A die plate to which a mold is attached has a large weight; therefore, its movement speed and acceleration rate need to be determined carefully.

For example, as a mold for producing a molding (a two-material molding having a size of 1550 millimeters×1200 millimeters), a rotational mold has a weight of 18 tons (9 tons/mold×2 molds), and the rotational die plate 9 for rotating a mold has a weight of 20 tons. Therefore, if a high movement speed is selected, necessary acceleration force becomes large or acceleration takes time, resulting in a large load on the driving unit. In addition, abrupt acceleration and deceleration can cause vibrations.

While a hydraulic driving unit is suitable for large driving force, when moving a heavy object, it is difficult for such a unit to accurately control the position, which takes time. Recently, ball screws that are accurate driving units have increasingly large capacity, and such ball screw apparatuses have come into use as moving units for considerably heavy objects. A ball screw apparatus driven by a servomotor facilitates control of the movement speed and the stop position of a driven object by programmed control of the rotational speed of the servomotor.

A servomotor and a ball screw driving unit may be employed as a moving unit for the movable die plate 3 and the rotational die plate 9 in the injection molding machine 10 for two-material molding, an acceleration profile (e.g., a sine curve) for smooth acceleration (deceleration) may be programmed with a control apparatus (not illustrated), and a speed and positional control program may be so built as to enable set inputs that are adjustable to make the movable die plate 3 and the reversal pedestal 7 on which the rotational die plate 9 is mounted move for mold opening and closing at the shortest mold opening and closing movement time, and the servomotor is controlled thereby. The use of the servomotor enables operation with high accuracy.

A control apparatus that is capable of feedback control of operation of each of the electric motors may be also provided, thereby enabling feedback control.

The speed of the cycle of two-material molding can be thus increased, which also enables operation with high accuracy.

In speed control by feedback control, speed control for acceleration or deceleration causes acceleration or deceleration to follow a primary linear line with a constant gradient, and speed control for acceleration or deceleration from a constant speed causes speed control to follow a quadric curve that is tangent to each primary linear speed of the constant speed and acceleration or the constant speed and deceleration. In this manner, smooth control can be achieved.

This attenuates impact in speed shifting and prevents overcurrent of the electric motors, thereby preventing damage to operating members by impact and lengthening the life of these members.

As a rotational speed controlling method for the rotational die plate 9, in a control apparatus (not illustrated), a rotational speed control program is so built as to enable set inputs to make rotational acceleration and rotational speed adjustable in a manner that the rotational die plate 9 on the reversal pedestal 7 rotates 180 degrees in the shortest rotation time, and the servomotor is controlled thereby.

Figure 11:
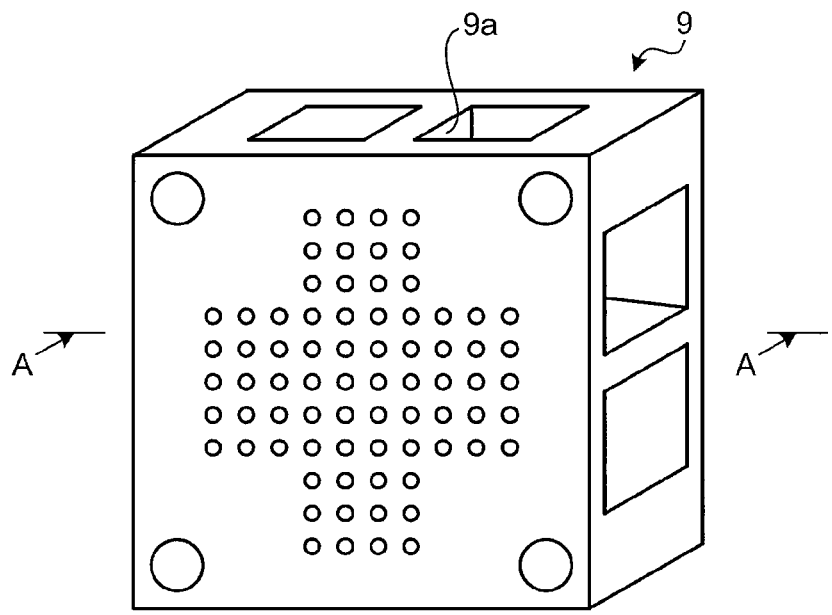
FIG. 11 is a perspective view of the rotational die plate.
Figure 12:
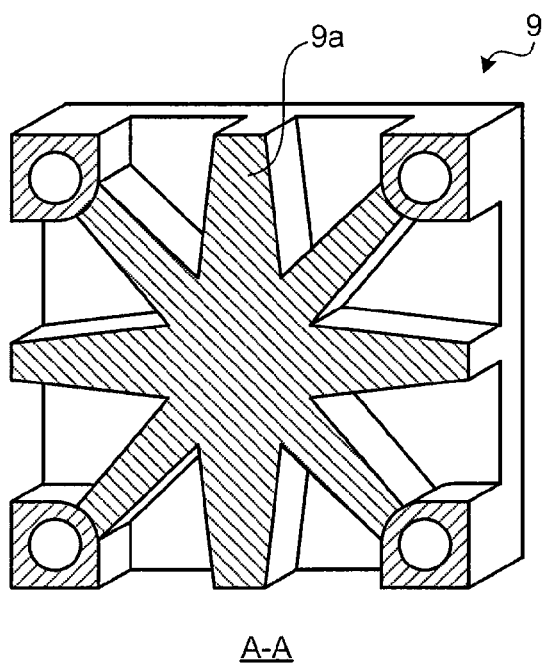
FIG. 12 is a sectional view along A-A in FIG. 11.

The weight of a reinforcement rib 9a of the rotational die plate 9 may be reduced in a manner that the thickness thereof reduces outwardly from the center of the rotational die plate gradually as illustrated in FIGS. 11 and 12.

Accordingly, rotational inertia accompanying reduction in the weight on the remote side from the rotational center can be reduced. As a result, power-saving, highly responsive, and highly accurate control can be achieved.

A molding may be released from the molds with a driving apparatus provided in the rotational die plate 9 and performing operations of movable members in the molds, such as molding ejection operation, movable nesting operation, and gate valve operation in the molds.

This eliminates the need for a molding ejection apparatus for ejecting a molding on the part of the mold, which simplifies the structure of the mold. As a result, different molds can be commonly used in the driving apparatus for operations of movable members in the mold, manufacturing cost for molds, which are different for each molding and required for each molding, can be reduced.

For the operational control of the molding ejection apparatus, a communication apparatus capable of sending and receiving control signals wirelessly may be provided, thereby reducing the weight with simplified wiring and reduced wiring members.

This eliminates the need to make communication wiring slidable for wired communications, which simplifies the wiring. As a result, the weight of the rotational die plate can be reduced.

In a collision avoidance method for the die plates, a distance required for stopping the movable die plate 3 or the reversal pedestal 7 on which the rotational die plate 9 is mounted is set as a collision avoidance distance e (not illustrated), the positions of the fixed die plate 2, the movable die plate 3, and the rotational die plate 9 are monitored. When any of their relative positions falls within the collision avoidance distance e, the approaching one is automatically decelerated or stopped to avoid collision during the opening and closing movement of the movable die plate 3 and the rotational die plate 9.

An example of the motion of the movable die plate 3 and the rotational die plate 9 and collision avoidance control therefor during movement of the movable die plate 3 and the rotational die plate 9 and rotation of the rotational die plate 9 will be described. Referring to FIG. 6, $c_2$ denotes a corner of the rotational die plate 9 or a corner of the rotational mold A (6A) that follows a rotational trajectory with the largest distance $r_2$ on the fixed die plate 2 side from the rotational axis of the rotational die plate 9 in the direction perpendicular to the rotational axis, and $c_1$ denotes a corner of the rotational die plate 9 or a corner of the rotational mold B (6B) that follows a rotational trajectory with the largest distance $r_1$ on the movable die plate 3 side from the rotational axis in the direction perpendicular to the rotational axis. $L_2$ denotes a distance from the rotational axis of the rotational die plate 9 to $c_2$, and $L_1$ denotes a distance from the rotational axis of the rotational die plate (9) to $c_1$.

FIG. 6 illustrates an example with the corner $c_2$ of the rotational mold A (6A) and the corner $c_1$ of the rotational mold B (6B). $L_1$ and $L_2$ are variables determined uniquely based on the rotational angle of the rotational die plate 9 and the distances $r_1$ and $r_2$.

Supposing that the rotational mold A (6A) and the rotational mold B (6B) have the same shape, $L_1=L_2$.

Note that a denotes the thickness of the fixed side mold 4, $b_2$ denotes a distance from the surface of the fixed die plate 2 to which the mold is attached to the rotational axis of the rotational die plate 9, and $b_1$ denotes a distance from the surface of the fixed die plate 2 to which the mold is attached to the end surface of the movable side mold 5. $b_1$ and $b_2$ are variables.

When the rotational mold A (6A) moves for mold closing toward the fixed side mold 4 while being rotating, and the formula $b_2-a-L_2=e$ is satisfied, the rotational die plate 9 is decelerated or stopped.

When the movable side mold 5 moves for mold closing toward the rotational mold B (6B) that is rotating, and the formula $b_1-b_2-L_1=e$ is satisfied, the movable die plate 3 is decelerated or stopped.

When the rotational mold A (6A) moves in a direction away from the fixed side mold 4 and the movable side mold 5 moves for mold opening in a direction away from the rotational mold B (6B), the movable die plate 3 moves for mold opening first, and mold opening movement or rotational operation of the rotational die plate (9) starts only after the gap between the movable side mold 5 and the rotational mold B (6B) exceeds e.

In the die plate speed control method described above, when the opening and closing movement of the movable die plate 3 and the rotational die plate 9 and the rotation of the rotational die plate 9 are performed in an overlapping manner, the distance between the rotational die plate 9 and the fixed die plate 2 and the distance between the rotational die plate 9 and the movable die plate 3 during the rotation of the rotational die plate 9 are calculated based on the position of the movable die plate and the position and the rotational angle of the rotational die plate. When any of the distances falls within the collision avoidance distance e, the approaching one may be automatically decelerated or stopped to avoid collision during the opening and closing movement of the movable die plate 3 and the rotational die plate 9 and the rotation of the rotational die plate 9.

By checking relative gaps between each of the die plates with an actual machine in operation, the gaps can be narrowed and the movement time of each die plate can be further shortened accordingly.

(Second Embodiment)

Figure 7:
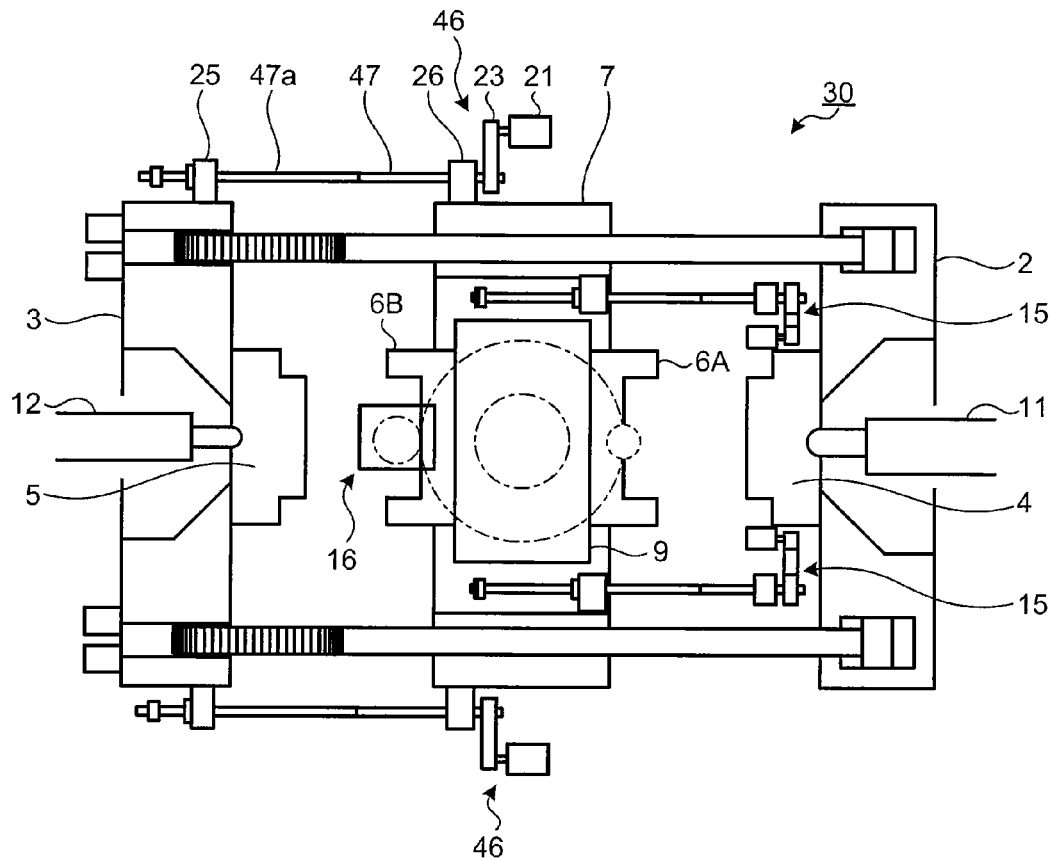
FIG. 7 is a schematic plan view of an injection molding machine for two-material molding according to a second embodiment of the present invention.

A second embodiment of the present invention will now be described. The second embodiment differs from the first embodiment in that, as illustrated in the schematic plan view of an injection molding machine 30 for two-material molding in FIG. 7, the servomotor A (21) for a movable die plate opening and closing unit 46 that drives the movable die plate 3 and the support base 26 for a ball screw shaft 47 are provided to the reversal pedestal 7. The second embodiment is the same as the first embodiment in other respects; therefore, the description of other configurations thereof will be omitted.

An advantage of the second embodiment is to make the ball screw shaft 47 short, and thus to enhance the critical speed of the ball screw shaft 4 and increase the opening and closing speed of the movable die plate 3. Because the rotational die plate 9 and the movable die plate 3 are connected directly with a ball screw, calculation of the relative position of the rotational die plate 9 and the movable die plate 3 is not required for detecting and controlling the relative distance between the rotational die plate 9 and the movable plate 3 during mold opening and closing, etc., which facilitates control.

(Third Embodiment)

Figure 8:
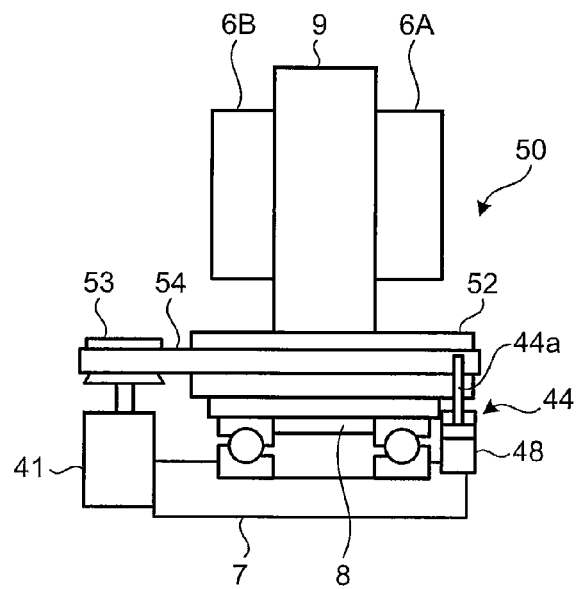
FIG. 8 is a side view for illustrating the schematic configuration of a rotational die plate according to a third embodiment of the present invention.

A third embodiment of the present invention will now be described. The third embodiment differs from the first embodiment in that, as illustrated in the schematic side view of a rotational die plate of FIG. 8, a rotational die plate rotating unit 50 includes the servomotor C (41) attached to the reversal pedestal 7, a pinion 53 attached to the servomotor C (41), a large gear 52 meshing with the pinion 53 and integrally provided to the rotational die plate 9, and an endless toothed belt 54 wound around the pinion 53 and the large gear 52; and is a rotation driving unit that makes the rotational die plate 9 one-half turn in a forward-and-backward direction. The third embodiment is the same as the first embodiment in other respects; therefore, the description of other configurations thereof will be omitted.

The present embodiment eliminates the need for making the large gear 52 and the pinion 53 directly abut each other, and it is thus possible to set the distance between the rotational axis of the large gear 52 and the rotational axis of the pinion 53 as desired. This provides an advantage of selecting the shapes of the gear and the pinion without being restricted by the distance between their axes when the pinion 53 cannot be provided directly near the large gear 52, or when their reduction ratio needs to be changed.

A configuration including a small-diameter chain sprocket provided to the output shaft of the servomotor C (41), a large-diameter chain sprocket integrally provided to the rotational die plate 9, and an endless chain wound around both chain sprockets may be employed in place of the pinion 53, the large gear 52, and the endless toothed belt 54.

(Fourth Embodiment)

Figure 9:
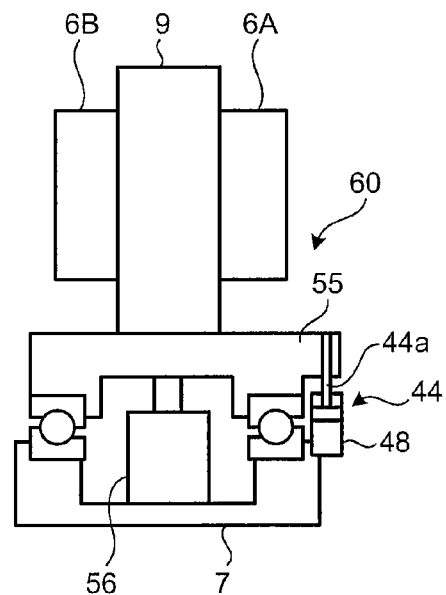
FIG. 9 is a side view for illustrating the schematic configuration of a rotational die plate according to a fourth embodiment of the present invention.

A fourth embodiment of the present invention will now be described. The fourth embodiment differs from the first and the second embodiments in that, as illustrated in the schematic side view of a rotational die plate of FIG. 9, a rotational die plate rotating unit 60 does not use any gears, endless belts, or the like for power transition, but employs a direct drive system in which a servomotor D (56) attached to the reversal pedestal 7 is directly connected to a rotational shaft 57 of a base 55 that is integral with the rotational die plate 9. The fourth embodiment is the same as the first embodiment in other respects; therefore, the description of other configurations thereof will be omitted.

The direct drive system by the servomotor D (56) involves no gear or belt. Therefore, the rotational die plate 9 rotates according to program commands, resulting in no backlash in operation.

Industrial Applicability

As described above, the present invention provides an injection molding machine for two-material molding including a moving unit that facilitates control of the movement speed of a movable die plate and a rotational die plate and a rotating unit that facilitates control of the rotational speed of the rotational die plate.

The invention claimed is:

1. An injection molding machine for two-material molding comprising:
   a reversal pedestal that is provided between a movable die plate to which a movable side mold is attached and a fixed die plate to which a fixed side mold is attached and movably in a same direction as the movable die plate;
   a rotational die plate that is 180 degrees rotatable on the reversal pedestal and to which molds are attached on both sides thereof to fit with the movable side mold and the fixed side mold and define respective cavities;
   a movable die plate mold opening and closing unit that opens and closes the mold of the movable die plate;
   a rotational die plate mold opening and closing unit that opens and closes the molds of the rotational die plate;
   a mold clamping unit that mold-clamps the three sets of die plates simultaneously after mold closing; and
   two sets of injection units that plasticize different resin materials and injection-fill the materials, wherein
   the mold clamping unit is a hydraulic mold clamping unit that mold-clamps the three sets of die plates simultaneously,
   the movable die plate opening and closing unit is a movable die plate opening and closing unit driven by an electric motor,
   the rotational die plate opening and closing unit is a rotational die plate opening and closing unit driven by an electric motor,
   a rotating unit for the rotational die plate is a rotation driving unit driven by an electric motor attached to the reversal pedestal, and
   a positioning pin is provided to the reversal pedestal and on which the rotational die plate rotating on the reversal pedestal abuts at rotational limits thereof, the positioning pin being made to protrude so that the rotational die plate is placed face to face with an opposite die plate at a position where the rotational die plate reaches one rotational limit and at a position of another rotational limit in a returning direction thereof.

2. The injection molding machine for two-material molding according to claim 1, wherein
   the hydraulic mold clamping unit includes a plurality of hydraulic cylinder apparatuses incorporated in the fixed die plate, a plurality of tie bars having grooves on leading ends thereof, the tie bars being connected to rams of the respective cylinder apparatuses and provided to penetrate the rotational die plate and the movable die plate, and split nuts provided outside of the movable die plate and engageable with the grooves of the tie bars; and is a hydraulic mold clamping unit that mold-clamps the three sets of die plates simultaneously, the movable die plate opening and closing unit is a movable die plate opening and closing unit including a ball screw shaft driven by an electric motor, and a ball screw nut attached to the rotational die plate and threaded onto the ball screw shaft, the rotational die plate opening and closing unit is a rotational die plate opening and closing unit including a ball screw shaft driven by an electric motor, and a ball screw nut attached to the reversal pedestal and threaded onto the ball screw shaft, the rotating unit for the rotational die plate is a rotation driving unit that drives a horizontal large gear provided 180-degree forwardly and backwardly rotatably with respect to a vertical central axis of the reversal pedestal and provided to the rotational die plate with a pinion provided to an output shaft of an electric motor provided to the reversal pedestal.

3. The injection molding machine for two-material molding according to claim 1, wherein the movable die plate opening and closing unit includes a ball screw shaft driven by an electric motor fixed to the fixed die plate or a base, and a ball screw nut attached to the movable die plate and threaded onto the ball screw shaft.

4. The injection molding machine for two-material molding according to claim 1, wherein the movable die plate opening and closing unit includes a ball screw shaft driven by an electric motor fixed to the reversal pedestal and rotatably supported through a ball bearing by a support base fixedly provided to the reversal pedestal with an axial direction of the ball screw shaft restrained, and a ball screw nut fixedly provided to the movable die plate and threaded onto the ball screw shaft.

5. The injection molding machine for two-material molding according to claim 1, wherein the rotating unit for the rotational die plate drives a horizontal large gear provided 180-degree rotatably with respect to a vertical central axis of the reversal pedestal and attached to the rotational die plate through a toothed belt or a chain and a pinion with an electric motor provided to the reversal pedestal.

6. The injection molding machine for two-material molding according to claim 1, wherein the rotating unit for the rotational die plate is directly driven by an electric motor attached to the reversal pedestal and rotating the rotational die plate 180 degrees.

7. The injection molding machine for two-material molding according to claim 1, wherein one set out of the two sets of injection units is provided on the fixed die plate side and is used for resin injection to the fixed mold, and another set is provided on the movable die plate side and is used for resin injection to the movable mold and moves during operation along with movement of the movable die plate.

8. The injection molding machine for two-material molding according to claim 1, further comprising:

a mold clamping apparatus that is hydraulically driven and mold-clamps the three sets of die plates simultaneously;

a movable die plate opening and closing apparatus that is driven by an electric motor and moves the movable die plate forwardly and backwardly with respect to the fixed die plate;

a rotational die plate opening and closing apparatus that is driven by an electric motor and operates the rotational die plate and the reversal pedestal in a direction same as the movable die plate;

a reversal pedestal rotating apparatus that is driven by an electric motor and rotates the reversal pedestal in a horizontal direction; and a control apparatus that is capable of feedback control of operation of each of the electric motors.

9. The injection molding machine for two-material molding according to claim 1, further comprising:

a mold clamping apparatus that is hydraulically driven and mold-clamps the three sets of die plates simultaneously;

a movable die plate opening and closing apparatus that is driven by an electric motor and moves the movable die plate forwardly and backwardly with respect to the fixed die plate;

a rotational die plate opening and closing apparatus that is driven by an electric motor and operates the rotational die plate and the reversal pedestal in a direction same as the movable die plate;

a reversal pedestal rotating apparatus that is driven by an electric motor and rotates the reversal pedestal in a horizontal direction; and a control apparatus that is capable of feedback control of operation of each of the electric motors, wherein at least one of the electric motors is a servomotor.

10. The injection molding machine for two-material molding according to claim 1, further comprising:

a mold clamping apparatus that is hydraulically driven and mold-clamps the three sets of die plates simultaneously;

a movable die plate opening and closing apparatus that is driven by an electric motor and moves the movable die plate forwardly and backwardly with respect to the fixed die plate;

a rotational die plate opening and closing apparatus that is driven by an electric motor and operates the rotational die plate and the reversal pedestal in a direction same as the movable die plate;

a reversal pedestal rotating apparatus that is driven by an electric motor and rotates the reversal pedestal in a horizontal direction; and a control apparatus that is capable of feedback control of operation of each of the electric motors, wherein in speed control by the feedback control, speed control for acceleration or deceleration causes acceleration or deceleration to follow a primary linear line with a constant gradient, and speed control for acceleration or deceleration from a constant speed causes speed control to follow a quadric curve that is tangent to each primary linear speed of the constant speed and acceleration or the constant speed and deceleration.

11. The injection molding machine for two-material molding according to claim 1, further comprising:

a mold clamping apparatus that is hydraulically driven and mold-clamps the three sets of die plates simultaneously;

a movable die plate opening and closing apparatus that is driven by an electric motor and moves the movable die plate forwardly and backwardly with respect to the fixed die plate;

a rotational die plate opening and closing apparatus that is driven by an electric motor and operates the rotational die plate and the reversal pedestal in a direction same as the movable die plate;

a reversal pedestal rotating apparatus that is driven by an electric motor and rotates the reversal pedestal in a horizontal direction; and a control apparatus that is capable of feedback control of operation of each of the electric motors, wherein in positioning to the reversal pedestal with the pin, the positioning pin is insertable into a positioning pin insertion hole at a position where the rotational die plate rotating on the reversal pedestal is placed face to face with an opposite die plate.

12. The injection molding machine for two-material molding according to claim 1, further comprising:

a mold clamping apparatus that is hydraulically driven and mold-clamps the three sets of die plates simultaneously;

a movable die plate opening and closing apparatus that is driven by an electric motor and moves the movable die plate forwardly and backwardly with respect to the fixed die plate;

a rotational die plate opening and closing apparatus that is driven by an electric motor and operates the rotational die plate and the reversal pedestal 7 in a direction same as the movable die plate;

a reversal pedestal rotating apparatus that is driven by an electric motor and rotates the reversal pedestal in a horizontal direction; and a control apparatus that is capable of feedback control of operation of each of the electric motors, wherein in positioning to the reversal pedestal with the pin, the positioning pin is insertable into a positioning pin insertion hole at a position where the rotational die plate rotating on the reversal pedestal is placed face to face with an opposite die plate, and the injection molding machine for two-material molding further comprising:

a control apparatus that enables control to start insertion operation of the positioning pin at a predetermined position in a rotational direction of the reversal pedestal that is reversely rotating where center of the positioning pin insertion hole is just ahead of coinciding with center of the positioning pin of a positioning pin insertion apparatus.

13. The injection molding machine for two-material molding according to claim 1, wherein a reinforcement rib of the rotational die plate has a thickness that reduces outwardly from center of the rotational die plate gradually.

14. The injection molding machine for two-material molding according to claim 1, further comprising a driving apparatus provided in the rotational die plate and performing operations of movable members in the molds, such as molding ejection operation, movable nesting operation, and gate valve operation in the molds.

15. The injection molding machine for two-material molding according to claim 1, further comprising:

a driving apparatus provided in the rotational die plate and performing operations of movable members in the molds, such as molding ejection operation, movable nesting operation, and gate valve operation in the molds; and a communication apparatus capable of sending and receiving control signals wirelessly for operational control of a molding ejection apparatus.

16. The injection molding machine for two-material molding according to claim 1, wherein one set out of the two sets of injection units is provided on the fixed die plate side and forwardly and backwardly movably with respect to the fixed die plate, another set is provided on a slidable based fixed on the movable die plate side and forwardly and backwardly movably with respect to the movable die plate, in mold opening and closing of the movable die plate, the other set of injection units is movable while abutting to the mold attached to the movable die plate.

17. A method of controlling an injection molding machine for two-material molding that uses the injection molding machine for two-material molding according to claim 1, the method comprising:

in a molding process of: mold closing of the movable die plate and the reversal pedestal on which the rotational die plate is mounted, mold clamping thereof, injection filling of molten resin, cooling thereof, mold opening movement of the movable die plate and the reversal pedestal on which the rotational die plate is mounted, 180-degree rotation of the rotational die plate, mold re-closing of the movable die plate and the reversal pedestal on which the rotational die plate is mounted, and mold clamping thereof, performing control for acceleration, speed maintenance, and deceleration with an electric motor to make mold opening and closing movement time of the movable die plate and the reversal pedestal on which the rotational die plate is mounted shortest.

18. A method of controlling an injection molding machine for two-material molding that uses the injection molding machine for two-material molding according to claim 1, the method comprising:

performing control for rotational acceleration, rotational speed maintenance, and rotational deceleration with an electric motor to make rotational time of rotating the rotational die plate on the reversal pedestal 180 degrees shortest.

19. The method of controlling an injection molding machine for two-material molding according to claim 17, wherein a distance required for stopping the movable die plate or the rotational die plate that is moving is set as a collision avoidance distance, and each movement leading end position of the movable die plate and the mold thereof and the rotational die plate and the mold thereof is monitored, and when a relative position of the movement leading ends of both die plates or the molds thereof falls within the collision avoidance distance, an approaching one of the die plates that is moving is automatically decelerated or stopped to avoid collision during opening and closing movement of the movable die plate and the rotational die plate.

20. The method of controlling an injection molding machine for two-material molding according to claim 17, wherein a distance required for stopping the movable die plate or the rotational die plate that is moving is set as a collision avoidance distance, and each movement leading end position of the movable die plate and the mold thereof and the rotational die plate and the mold thereof is monitored, and when a relative position of the movement leading ends of both die plates or the molds thereof falls within the collision avoidance distance, an approaching one of the die plates that is moving is automatically decelerated or stopped to avoid collision during opening and closing movement of the movable die plate and the rotational die plate, and when the opening and closing movement of the movable die plate and the rotational die plate and rotation of the rotational die plate are performed in an overlapping manner, a relative distance between the rotational die plate or the mold thereof and the fixed die plate or the mold thereof and a relative distance between the rotational die plate or the mold thereof and the movable die plate or the mold thereof during the rotation of the rotational die plate are calculated based on a position of the movable die plate, a position and a rotational angle of the rotational die plate, and shape sizes of the molds thereof, and when any of the relative positions falls within the collision avoidance distance, movement of the die plate or rotation of the rotational die plate that is approaching is automatically decelerated or stopped.

* * * * *